US011901959B2

(12) United States Patent
Taniguchi et al.

(10) Patent No.: US 11,901,959 B2
(45) Date of Patent: Feb. 13, 2024

(54) COMMUNICATION SYSTEMS, BASE STATIONS, AND COMMUNICATION METHODS

(71) Applicant: NIPPON TELEGRAPH AND TELEPHONE CORPORATION, Tokyo (JP)

(72) Inventors: Tomohiro Taniguchi, Musashino (JP); Ryota Shiina, Musashino (JP); Kazutaka Hara, Musashino (JP); Tomoki Murakami, Musashino (JP); Toshiro Nakahira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 139 days.

(21) Appl. No.: 17/624,126

(22) PCT Filed: Jul. 2, 2019

(86) PCT No.: PCT/JP2019/026359
§ 371 (c)(1),
(2) Date: Dec. 30, 2021

(87) PCT Pub. No.: WO2021/001938
PCT Pub. Date: Jan. 7, 2021

(65) Prior Publication Data
US 2022/0352993 A1 Nov. 3, 2022

(51) Int. Cl.
*H04B 10/85* (2013.01)
*H04B 10/112* (2013.01)
*H04W 12/06* (2021.01)

(52) U.S. Cl.
CPC ......... *H04B 10/85* (2013.01); *H04B 10/1129* (2013.01); *H04W 12/06* (2013.01)

(58) Field of Classification Search
None
See application file for complete search history.

(56) References Cited

U.S. PATENT DOCUMENTS

| 6,225,955 | B1* | 5/2001 | Chang | ...................... | H01Q 5/22 |
|  |  |  |  |  | 343/720 |
| 2003/0152389 | A1* | 8/2003 | Sala | ................... | H04Q 11/0067 |
|  |  |  |  |  | 398/98 |

(Continued)

FOREIGN PATENT DOCUMENTS

| JP | 2010528358 A | 8/2010 |
| JP | 2014220791 A | 11/2014 |
| JP | 2017108202 A | 6/2017 |

*Primary Examiner* — Darren E Wolf
(74) *Attorney, Agent, or Firm* — Harness, Dickey & Pierce, P.L.C.

(57) ABSTRACT

An object is to provide a communication system, a base station, and a communication method that can avoid a state in which an RF wireless communication cannot be started due to the quality of optical wireless communication.
In an optical communication system according to the present invention, a base station device repeatedly transmits an authentication information frame addressed to a terminal device at a predetermined cycle by the optical wireless communication, the frame including authentication information for connection to the terminal device by the RF wireless communication. Even if the terminal fails to acquire the authentication information at a certain timing due to the quality of optical wireless communication, the communication system has a mechanism that acquires the same authentication information at regular time intervals, so that terminal authentication processing can be performed at the time when the terminal acquires the authentication information.

7 Claims, 4 Drawing Sheets

(56) References Cited

U.S. PATENT DOCUMENTS

| | | | |
|---|---|---|---|
| 2008/0145056 A1* | 6/2008 | Boldi | H04J 14/0283 |
| | | | 398/79 |
| 2011/0119745 A1 | 5/2011 | Bremner | |
| 2011/0262145 A1* | 10/2011 | Ruggiero | H01Q 19/13 |
| | | | 398/115 |
| 2013/0219407 A1* | 8/2013 | Weinman, Jr. | G06F 9/4843 |
| | | | 718/105 |
| 2013/0330088 A1 | 12/2013 | Oshima et al. | |
| 2014/0029494 A1* | 1/2014 | Sundaram | H04W 52/0235 |
| | | | 370/311 |
| 2016/0007288 A1* | 1/2016 | Samardzija | H04W 52/0229 |
| | | | 370/311 |
| 2017/0162940 A1 | 6/2017 | Murayama et al. | |
| 2018/0139202 A1* | 5/2018 | Sethi | H04W 84/12 |

\* cited by examiner

COMMUNICATION SYSTEMS, BASE STATIONS, AND COMMUNICATION METHODS

CROSS-REFERENCE TO RELATED APPLICATIONS

This application is a 371 U.S. National Phase of International Application No. PCT/JP2019/026359 filed on Jul. 2, 2019. The entire disclosure of the above application is incorporated herein by reference.

TECHNICAL FIELD

The present disclosure relates to an optical/RF wireless hybrid communication between a base station and a terminal.

BACKGROUND ART

In the description herein, a direction from a base station to a terminal is referred to as a "downlink", and a direction from a terminal to a base station is referred to as an "uplink". For a wireless communication system such as Wi-Fi, there is known an optical/RF wireless hybrid communication in which connection authentication data such as an SSID and a password (PW) required for connecting a base station and a terminal is notified to the terminal by using an optical wireless communication (downlink communication using an LED lighting or the like) (e.g., see PTL 1). The optical/RF wireless hybrid communication has an advantage of allowing the terminal user to connect to the Wi-Fi just by entering an optical wireless communication area without grasping the SSID and PW and then performing an operation for inputting them or the like.

CITATION LIST

Patent Literature

[PTL 1] U.S. Patent Application Publication No. 2018/0139202

SUMMARY OF THE INVENTION

Technical Problem

The quality of optical wireless communication varies greatly depending on the line-of-sight and angle between a base station and a terminal. Accordingly, there is a high possibility that the terminal fails to receive authentication information transmitted by the base station through an optical wireless communication. Optical wireless communication has a problem that there is no uplink communication, and before the start of an RF (Radio Frequency) wireless communication, it is not possible to perform arrival check whether the terminal successfully receives the authentication information and for the terminal to issue a request for the authentication information, resulting in that the RF wireless communication cannot be started when the authentication information does not yet arrive at the terminal.

Therefore, an object of the present invention is to provide a communication system, a base station, and a communication method that can avoid a state in which the RF wireless communication cannot be started due to the quality of optical wireless communication.

Means for Solving the Problem

In order to achieve the above object, a communication system according to the present invention is configured to, when transmitting authentication information from a base station to a terminal by an optical wireless communication, repeatedly transmit the authentication information at regular intervals (carousel system).

Specifically, a communication system according to the present invention is a communication system in which communication between a base station and a terminal is performed by an optical wireless communication and an RF (Radio Frequency) wireless communication, wherein the base station includes: an optical transmitter that repeatedly transmits a frame to the terminal by the optical wireless communication, the frame including authentication information for permitting a communication using the RF wireless communication; a base station RF transmitter and receiver that receives the authentication information transmitted by the RF wireless communication from the terminal, and transmits and receives communication data between the terminal and the network to and from the terminal by the RF wireless communication; and an authentication information control circuit that authenticates the terminal that has transmitted the authentication information and permits a communication between the authenticated terminal and the network, and the terminal includes: an optical receiver that receives the frame; an authentication information check circuit that extracts the authentication information from the frame; and a terminal RF transmitter and receiver that transmits the authentication information to the base station by the RF wireless communication, and transmits and receives communication data between the base station and a network to and from the base station by the RF wireless communication.

Further, a base station according to the present invention is a base station that performs communication with a terminal by an optical wireless communication and an RF wireless communication, and includes: an optical transmitter that repeatedly transmits a frame to the terminal by the optical wireless communication, the frame including authentication information for permitting a communication using the RF wireless communication; a base station RF transmitter and receiver that receives the authentication information transmitted by the RF wireless communication from the terminal, and transmits and receives communication data between the terminal and the network to and from the terminal by the RF wireless communication; and an authentication information control circuit that authenticates the terminal that has transmitted the authentication information and permits a communication between the authenticated terminal and the network.

Further, a communication method according to the present invention is a communication method in which communication between a base station and a terminal is performed by an optical wireless communication and an RF wireless communication, and includes: repeatedly transmitting a frame from the base station to the terminal by the optical wireless communication, the frame including authentication information for permitting a communication using the RF wireless communication; extracting, by the terminal that has received the frame, the authentication information from the frame; transmitting the authentication information to the base station by the RF wireless communication; and authenticating, by the base station that has received the authentication information transmitted by the RF wireless communication from the terminal, the terminal that has transmitted the authentication information to permit a communication between the authenticated terminal and a network.

Even if the terminal fails to acquire the authentication information at a certain timing due to the quality of optical wireless communication, the communication system has a mechanism that acquires the same authentication information at regular time intervals, so that terminal authentication processing can be performed at the time when the terminal acquires the authentication information. Therefore, the present invention can provide a communication system, a base station, and a communication method that can avoid a state in which the RF wireless communication cannot be started due to the quality of optical wireless communication.

In the communication system according to the present invention, the RF wireless communication has a plurality of communication protocols, and the optical transmitter forms the frame including the authentication information for each of the communication protocols, and repeatedly transmits the frames in order.

In the communication system according to the present invention, the RF wireless communication has a plurality of communication protocols, and the authentication information check circuit causes the terminal RF transmitter and receiver to transmit the authentication information by using the communication protocol specified by information included in the frame and to transmit and receive the communication data.

In the communication system according to the present invention, the RF wireless communication has a plurality of communication protocols, the optical transmitter can transmit the frame with a plurality of wavelengths, and to use a desired communication protocol of the RF wireless communication with the terminal, transmits the frame with a wavelength corresponding to the desired communication protocol, and the authentication information check circuit causes the terminal RF transmitter and receiver to transmit the authentication information by using a communication protocol for the wavelength of the frame received by the optical receiver, and to transmit and receive the communication data.

In the communication system according to the present invention, a plurality of base stations are provided, and the communication system further includes: a control device that collects communication usage information related to the RF wireless communication from each of the base stations, determines, based on the communication usage information, the base station with which the terminal is to communicate by the RF wireless communication, and causes each of the base stations to transmit the frame in which an instruction for performing the RF wireless communication with the determined base station is included.

Note that the above inventions can be combined as much as possible.

Effects of the Invention

The present invention can provide a communication system, a base station, and a communication method that can avoid a state in which the RF wireless communication cannot be started due to the quality of optical wireless communication.

DESCRIPTION OF EMBODIMENTS

Figure 1:
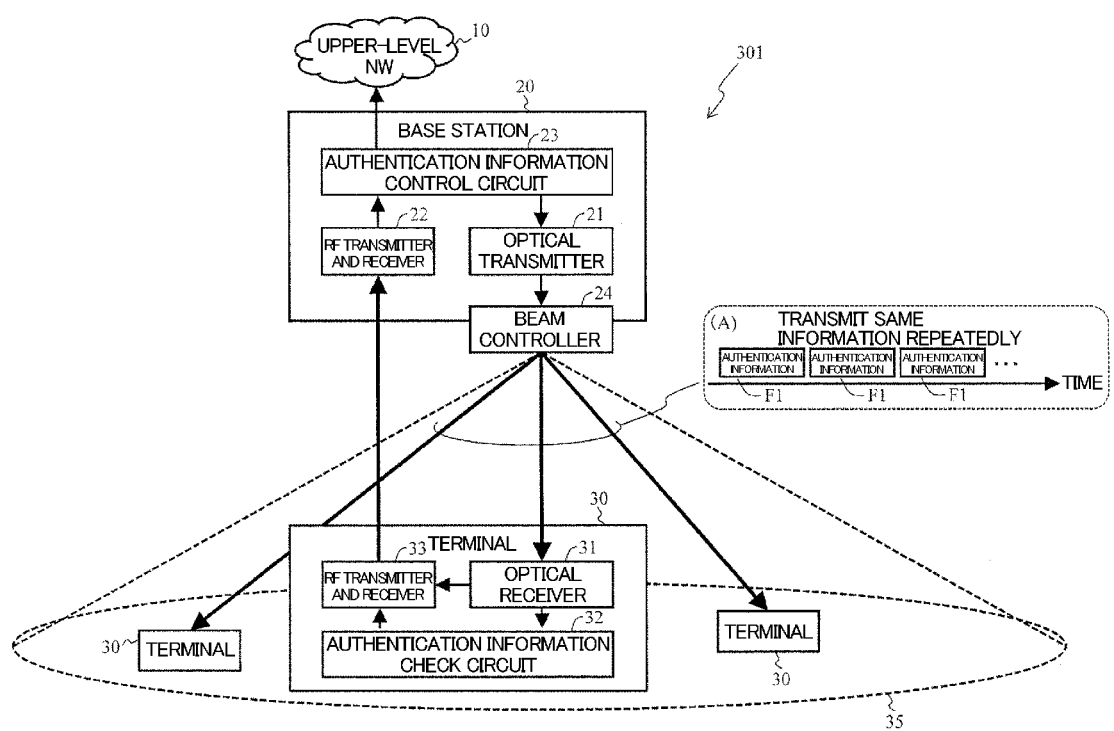
FIG. 1 is a diagram illustrating a communication system according to the present invention.

Embodiments of the present invention will be described with reference to the accompanying drawings. The embodiments described below are examples of the present invention, and the present invention is not limited to the following embodiments. Note that, in the description herein and the drawings, the components having the same reference numerals indicate the same components.

First Embodiment

FIG. 1 is a diagram illustrating a communication system 301 according to the present embodiment. The communication system 301 is a communication system that performs communication between a base station 20 and a terminal 30 by an optical wireless communication and an RF wireless communication.

The base station 20 includes: an optical transmitter 21 that repeatedly transmits a frame F1 to the terminal 30 by the optical wireless communication, the frame F1 including authentication information for permitting a communication using the RF wireless communication; a base station RF transmitter and receiver 22 that receives the authentication information transmitted by the RF wireless communication from the terminal 30, and transmits and receives communication data between the terminal 30 and a network 10 to and from the terminal 30 by the RF wireless communication; and an authentication information control circuit 23 that authenticates the terminal 30 that has transmitted the authentication information and permits a communication between the authenticated terminal 30 and the network 10.

The terminal 30 includes: an optical receiver 31 that receives the frame F1; an authentication information check circuit 32 that extracts the authentication information from the frame F1; and a terminal RF transmitter and receiver 33 that transmits the authentication information to the base station 20 by the RF wireless communication, and transmits and receives communication data between the base station 20 and the network 10 to and from the base station 20 by the RF wireless communication.

In the communication system 301, the base station 20 repeatedly transmits the frame F1, which includes authentication information for permitting a communication using the RF wireless communication, to the terminal 30 by the optical wireless communication.

In response to receiving the frame F1, the terminal 30 extracts the authentication information from the frame F1 and transmits the authentication information to the base station 20 by the RF wireless communication.

In response to receiving the authentication information transmitted by the RF wireless communication from the terminal 30, the base station 20 authenticates the terminal 30 that has transmitted the authentication information to permit a communication between the authenticated terminal 30 and the network 10.

The authentication information control circuit 23 manages the authentication information for using the RF wireless communication. The authentication information includes an SSID (Service Set Identifier), an ID (identification number), a PW (password), and other information. The authentication information control circuit 23 repeatedly outputs the authentication information to the optical transmitter 21 at regular intervals.

The optical transmitter 21 uses a light source such as an LED that can be dimmed or toned. The light source may also serve as a lighting application. The optical transmitter 21 converts the authentication information from the authentication information control circuit 23 into an optical signal with a predetermined wavelength, power, modulation method, or data rate.

A beam regulator 24 controls the beam shape so that the optical signal from the optical transmitter 21 can reach a predetermined area 35, and then transmits the optical signal to the space. If there are no obstacles that block the light, the optical signal reaches all terminals 30 in the predetermined area 35. If there is any obstacle, the optical signal cannot reach a terminal 30. However, as illustrated in a sub-image (A) of FIG. 1, the optical signal includes repeated frames F1 each including the authentication information. Thus, even if the optical signal cannot reach a terminal 30 at a certain timing, the optical signal can reach the terminal 30 by moving the terminal or the obstacle.

The optical receiver 31 of the terminal 30 converts the optical signal from the optical transmitter 21 into an electric signal. The optical receiver 31 is not limited to an optical receiver dedicated to the optical wireless communication, and if the terminal 30 is a smart phone, its camera function may be used.

The authentication information check circuit 32 checks for the authentication information in the output electric signal of the optical signal. The authentication information check circuit 32 outputs the authentication information by a protocol for the RF wireless communication to be connected or the RF wireless communication specified in the frame F1.

The RF transmitter and receiver 33 and the RF transmitter and receiver 22 transmit and receive RF wireless signals by using the protocol. That protocol is Wi-Fi, LTE, or the like. For example, a plurality of wireless standards such as 2.4 GHz/5 GHz Wi-Fi may be supported. The authentication information checked by the authentication information check circuit 32 is transmitted from the terminal 30 to the base station 20, that is, between the RF transmitter and receiver 33 and the RF transmitter and receiver 22.

The authentication information control circuit 23 permits communication with the upper-level NW 10 for the terminal 30 for which the matching of the authentication information has been confirmed.

Figure 2:
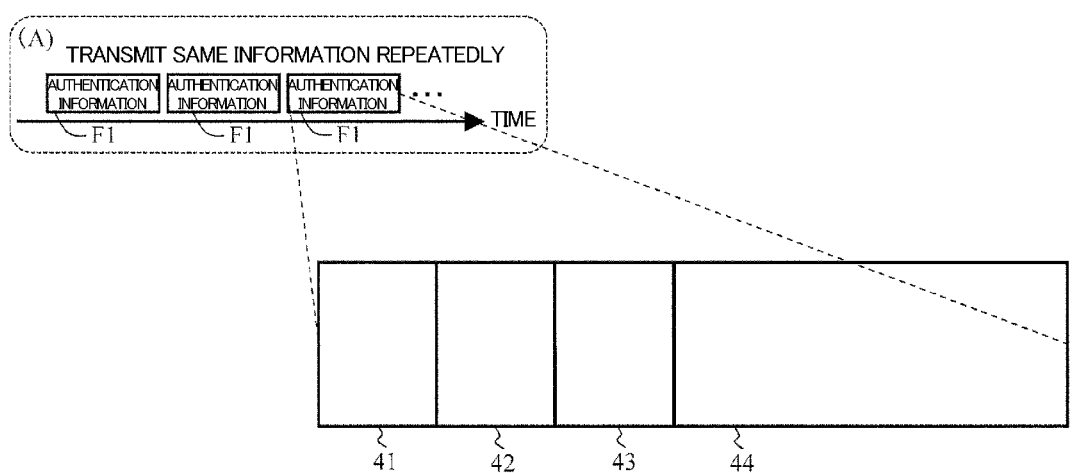
FIG. 2 is a diagram illustrating a structure of a frame to be transmitted by a base station of the communication system according to the present invention.

FIG. 2 is a diagram illustrating the frame F1. The frame F1 has a header 41, a logic section 42, an authentication information section 43, and an extension section 44. The header 41 indicates that the frame F1 is authentication information for the RF wireless communication. The logic section 42 includes a value indicative of a logic of authentication determination for the authentication information. That logic is a logic such that, for example, for a 1-bit value of "0", all the terminals that have received this authentication information are permitted to connect, and for a 1-bit value of "1", it is determined whether the terminal(s) is/are permitted or not permitted to connect in accordance with the content described in the extension section 44 (such as making connection permitted only when a specific wavelength/color or bit pattern is detected).

The authentication information section 43 includes the content of the authentication information for connection with the RF wireless communication. Note that it may include information on a plurality of communication standards such as 2 GHz and 5 GHz Wi-Fi. The expansion section 44 includes a logic for operating the authentication information check circuit 32 of the terminal 30. For example, if the RF wireless communication is made to be permitted only when a specific wavelength/color or pattern is detected, the determination logic is described in the extension section 44.

Figure 3:
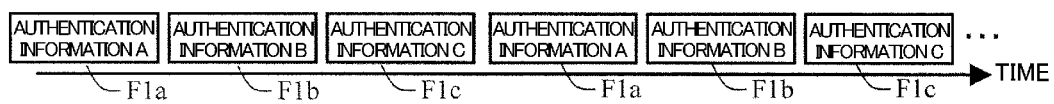
FIG. 3 is a diagram illustrating an example of transmission of the frame from the base station of the communication system according to the present invention.

Note that if the RF wireless communication has a plurality of communication protocols, the optical transmitter 21 may form frames (F1a, F1b, F1c) including authentication information for each communication protocol and repeatedly transmit them in order. FIG. 3 is a diagram illustrating an example in which the frames (F1a, F1b, F1c) including authentication information different for each communication protocol are repeatedly transmitted in order. If one base station 20 implements a plurality of RF wireless communication standards (A to C), the optical transmitter 21 may repeatedly transmit a plurality of types of frames (different in content of the authentication information section 43) corresponding to the standards.

Second Embodiment

Figure 4:
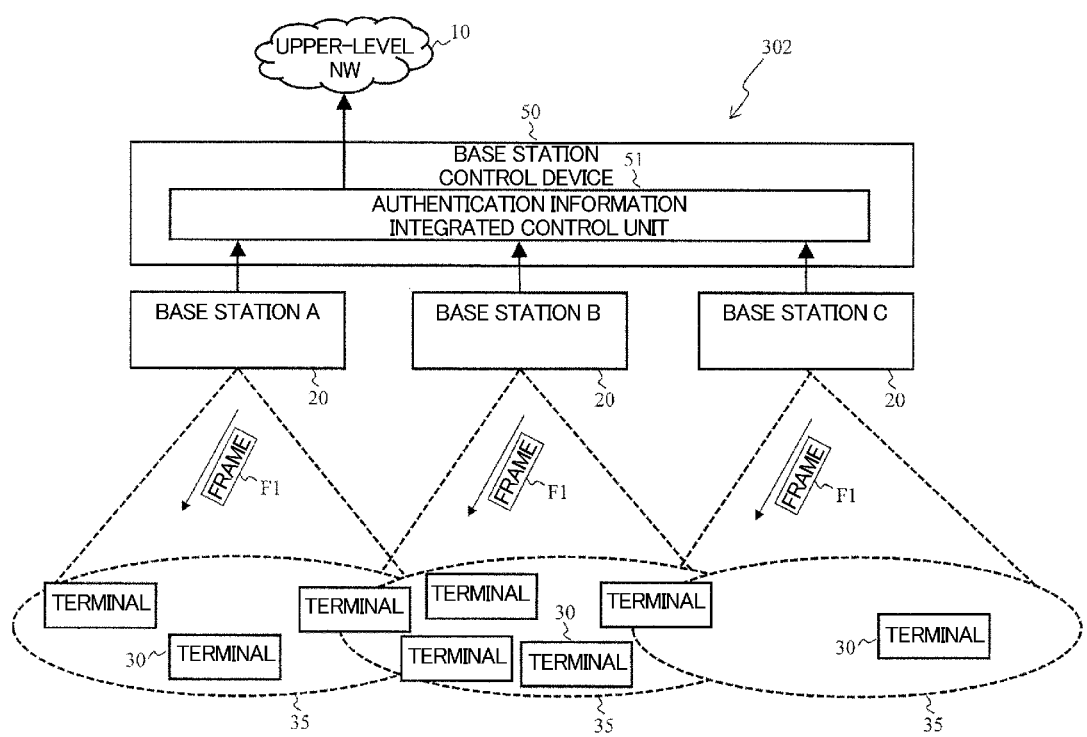
FIG. 4 is a diagram illustrating a communication system according to the present invention.

FIG. 4 is a diagram illustrating a communication system 302 according to the present embodiment. The communication system 302 further includes a base station control device 50 that manages a plurality of base stations 20 each of which is the base station in the communication system 301 of FIG. 1. The base station control device 50 includes an authentication information integrated control unit 51 that performs the following operations. The authentication information integrated control unit 51 collects communication usage information related to the RF wireless communication from the respective base stations 20, and determines, based on the communication usage information, the base station 20 with which the terminal 30 is to perform the RF wireless communication. Then, the authentication information integrated control unit 51 causes each of the base stations 20 to transmit the frame F1 in which an instruction for performing the RF wireless communication with the determined base station 20 is included.

The authentication information integrated control unit 51 collects the communication usage information such as the number of connected terminals 30 and the used capacity from each base station 20. The authentication information integrated control unit 51 sets a connection policy for each base station 20 based on the communication usage information. The connection policy is, for example, a policy in which a terminal 30 in an area where areas 35 overlap is preferentially connected to any of the base stations having a small load for load balancing. The authentication information integrated control unit 51 determines a determination logic corresponding to this policy, and describes that in the extension section 44 of the frame F1 to instruct each base station 20.

Third Embodiment

A communication system according to the present embodiment makes it possible for the communication system 301 according to the first embodiment to perform an optical wireless communication using a plurality of wavelengths. In this communication system, the RF wireless communication has a plurality of communication protocols, the optical transmitter 21 can transmit the frame F1 with a plurality of wavelengths, and to use a desired communication protocol of the RF wireless communication with the terminal 30, transmits the frame F1 with a wavelength corresponding to the desired communication protocol, and the authentication information check circuit 32 causes the terminal RF transmitter and receiver 33 to transmit the authentication information by using a communication protocol corresponding to the wavelength of the frame F1 received by the optical receiver 31, and to transmit and receive the communication data.

In the optical wireless communication, by selectively using a plurality of wavelengths, (1) area identification and (2) base station allocation become possible. Each will now be explained. Note that, in this embodiment, the same content is described in the expansion section 44 of the frame F1 regardless of the wavelength (color) of the optical signal to be transmitted.

(1) Area Identification

Differences in configuration between the present communication system and the communication system 301 according to the first embodiment will be described.

The optical transmitter 21 of the base station 20 is of a tunable wavelength type. The authentication information control circuit 23 also outputs wavelength control information. This wavelength control information corresponds to an available RF wireless communication standard.

The authentication information check circuit 32 of the terminal 30 also obtains wavelength (color) information of the optical signal, extracts the authentication information of the RF wireless communication from the frame F1 only when the wavelength (color) information indicates a predetermined wavelength (color), and outputs the extracted authentication information. The determination logic based on this wavelength information is described in the extension section 44 of the frame F1 at the base station 20.

A specific example will be given. In a case where the optical transmitter 21 also serves as a lighting application, light of all wavelengths (colors) is always transmitted. Here, when the RF wireless communication is permitted in the area 35 including red light from the optical transmitter 21, "authenticated (connection permitted) for red" is described in the extension section 44 of the frame F1. Further, when only a specific RF wireless communication standard is permitted in the area 35 including red or blue light from the optical transmitter 21, "802.11n Wi-Fi available for red; 802.11ac also available for blue" in the extension section 44 of the frame F1. On the other hand, in a case where the optical transmitter 21 does not serve as a lighting application, "authenticated for red" may be described in the extension section 44 of the frame F1 to control so that only light with a red wavelength is transmitted from the optical transmitter 21.

The present configuration has the following effective advantages.

Setting a specific wavelength (color) only for the RF wireless communication area enables the user to visually recognize the RF wireless communication area.

Classifying wavelengths (colors) according to the specifications/standards of the RF wireless communication enables the user to visually recognize available RF standards. For example, the user can recognize that 802.11n Wi-Fi is available for red lighting and 802.11ac is available for blue lighting.

(2) Base Station Allocation

The present communication system has the same configuration as the communication system 302 according to the second embodiment. In the present communication system, it is assumed that a plurality of base stations 20 are arranged at high density. The authentication information integrated control unit 51 of the base station control device 50 extracts information (communication usage information) on the number of terminals 30 connected to each base station 20 and the used capacity. Then, the authentication information integrated control unit 51 adaptively controls the load balancing among the base stations based on the communication usage information.

Specifically, the authentication information integrated control unit 51 controls each base station so that a determination logic of "preferentially connect with the communication method for red or blue when authentication information with green and red or blue is detected" is described in the expansion section 44 of the frame F1. Further, the authentication information integrated control unit 51 may control each base station so that a determination logic (correspondence between wavelength (color) and priority) of "'priority 1' is set for the signal with the communication protocol for red or blue; 'priority 2' is set for the signal with the communication protocol for green" is described in the expansion section 44 of the frame F1.

The authentication information check circuit 32 of the terminal 30 outputs, to a predetermined base station 20, the authentication information by the RF wireless communication in accordance with the determination logic.

The present configuration has the following effective advantage.

In a situation where a plurality of RF wireless communication areas are arranged at high density, which base station/resource (frequency channel, etc.) each terminal is allocated can be controlled using wavelengths (colors) regardless of any user operation.

Fourth Embodiment

A communication system according to the present embodiment makes it possible for the communication system 301 according to the first embodiment to perform an optical wireless communication using a plurality of wavelengths. In this communication system, the RF wireless communication has a plurality of communication protocols, the authentication information check circuit 32 causes the terminal RF transmitter and receiver 33 to transmit the authentication information by using a communication protocol specified by the information included in the frame F1, and to transmit and receive the communication data.

In the optical wireless communication, by selectively using a plurality of wavelengths, (1) control of RF wireless communication standard to be used for connection and (2) base station allocation become possible. Each will now be explained. Note that, in the present embodiment, in consideration of the movement of the terminal, the same content is described in the expansion section 44 of the frame F1 transmitted by all the base stations except for special cases.

(1) Control of RF Wireless Communication Standard to be Used for Connection

Differences in configuration between the present communication system and the communication system 301 according to the first embodiment will be described.

The optical transmission unit 21 describes the determination logic for the desired control content as a bit pattern in the extension section 44 of the frame F1. For example, the determination logic is a logic of "preferentially connect with 5 GHz RF wireless communication when the existence of both 2.4 GHz and 5 GHz RF wireless communication is detected". Further, that logic may be a logic of correspondence between wireless protocol and priority such as "'priority 1' is set for 5 GHz RF wireless communication; 'priority 2' is set for 2.4 GHz RF wireless communication".

The authentication information check circuit 32 of the terminal 30 reads the bit pattern described in the expansion section 44 of the frame F1 and outputs, to a predetermined base station 20, the authentication information by the RF wireless communication in accordance with the determination logic.

The present configuration has the following effective advantage.

When the base station supports a plurality of RF wireless communication standards, which resource (frequency channel, etc.) the terminal is allocated can be controlled at the base station side using a bit pattern regardless of any user operation. For example, for a situation where the base station is crowded with the 2.4 GHz band, it is possible to control the terminal to be preferentially connected with the 5 GHz band.

(2) Base Station Allocation

The present communication system has the same configuration as the communication system 302 according to the second embodiment. In the present communication system, it is assumed that a plurality of base stations 20 are arranged at high density. The authentication information integrated control unit 51 of the base station control device 50 extracts information (communication usage information) on the number of terminals 30 connected to each base station 20 and the used capacity. Then, the authentication information integrated control unit 51 adaptively controls the load balancing among the base stations based on the communication usage information.

Specifically, the authentication information integrated control unit 51 controls each base station so that a determination logic of "preferentially connect to base station A or C when authentication information of base station B and base station A or C is detected" is described in the expansion section 44 of the frame F1. Further, the authentication information integrated control unit 51 may control each base station so that a determination logic (correspondence between wavelength (color) and priority) of "'priority 1' is set for base station A or C; 'priority 2' is set for base station B" is described in the expansion section 44 of the frame F1.

Further, in FIG. 4, in a case where base station A and base station C are sufficiently separated from each other and any terminal does not receive radio waves from these base stations at the same time, each base station may describe the same content in the expansion sections 44 of all the frames F1. For example, the authentication information integrated control unit 51 may control each base station so that only its own priority information and priority information of the adjacent base stations are described in the extension section 44 of the frame F1.

The authentication information check circuit 32 of the terminal 30 outputs, to a predetermined base station 20, the authentication information by the RF wireless communication in accordance with the determination logic.

The present configuration has the following effective advantage.

In a situation where a plurality of RF wireless communication areas are arranged at high density, which base station/resource (frequency channel, etc.) the terminal is allocated can be controlled using bit patterns regardless of any user operation.

Fifth Embodiment

A communication system according to the present embodiment adjusts the transmission scheme for the frame 1 in the communication system 301 of the first embodiment. Adjusting the transmission scheme of optical wireless communication makes it possible to apply, to the optical wireless communication, (1) adaptation to quality of optical transmission line, (2) adaptation to respective terminal types, and (3) area limitation of available RF wireless communication. Each will now be explained.

(1) Adaptation to Quality of Optical Transmission Line

The base station 20 further includes an optical transmission line quality check unit that can check the state of the optical transmission line in the area by using a camera, an optical sensor, or the like. Further, the authentication information control circuit 23 of the base station 20 controls the data modulation scheme for the frame F1 output from the optical transmitter 21 and the transmission cycle (carousel cycle) for the frame F1. Specifically, when the optical transmission line quality check unit determines that the state of the optical transmission line indicates a predetermined quality or less, the optical transmission line quality check unit instructs the optical transmitter 21 to change the current modulation scheme to a modulation scheme that requires a lower SNR (Signal to Noise Ratio). For example, the optical transmission line quality check unit instructs the optical transmitter 21 to change 16QAM to OOK. Since the change from 16QAM to OOK results in a reduced data rate, the optical transmission line quality check unit instructs the authentication information control circuit 23 to lengthen the carousel cycle.

The present configuration has the following effective advantage.

Adjusting the optical signal modulation scheme and carousel cycle (which affects the required data rate) makes it possible to improve the reliability of transmission of authentication information even if the quality of the optical transmission line (SNR on the receiving side) is low due to the influence of the line of sight between the base station and the terminal.

(2) Adaptation to Respective Terminal Types

The authentication information control circuit 23 of the base station 20 controls the optical transmitter 21 so that the frames F1 including the same authentication information are sequentially transmitted by two or more types of modulation schemes or data rates. For example, in transmitting same SSID/PW information, the authentication information control circuit 23 causes the optical transmitter 21 to prepare a plurality of frames F1, such as 10 kbps with 16QAM, 10 kbps with OOK, 100 bps with 16QAM, and 100 bps with OOK, and to repeatedly transmit them in order.

The terminal 30 demodulates only the frames that can be demodulated by the authentication information check circuit 32 from among the plurality of frames, and checks the authentication information.

The present configuration has the following effective advantage.

Preparing a plurality of optical signal modulation schemes and symbol rates makes it possible to improve the reliability of the transmission of authentication information even if the formats available for optical signals (symbol rate, modulation scheme) are different depending on the type of the terminal.

(3) Area Limitation of Available RF Wireless Communication

The authentication information control circuit 23 of the base station 20 also sets the expiration date of the authentication information. For example, described in the extension section 44 of the frame F1 is a logic of "inhibit the terminal from performing the RF wireless communication when a new frame F1 is not received within a predetermined validity period (ex.: several tens of seconds to several tens of minutes)". At the same time, the authentication information control circuit 23 sets the carousel cycle corresponding to the above-mentioned "validity period". This carousel cycle is sufficiently shorter than the validity period.

When the authentication information check 32 of the terminal 30 finds an authentication signal at a certain point in accordance with the above-mentioned determination logic but then receives/finds no new authentication signal during the validity period, the authentication information check 32 instructs the RF transmitter and receiver 33 to stop the RF wireless communication. Alternatively, when the authentication information is transmitted from the terminal 30 to the base station 20 by RF wireless communication but then no new authentication signal is transmitted from the terminal 30 to the base station 20 during the validity period, the base station 20 stops (disables) the RF wireless communication with the corresponding terminal 30.

The present configuration has the following effective advantage.

The expiration date information included in the authentication information makes it possible to control so that the use of the RF wireless communication is permitted only when the terminal is in the area. Accordingly, there are merits such as prevention of throughput reduction due to connection of terminals outside the area and ensuring security.

OTHER EMBODIMENTS

In the above-described embodiments, as an example, a mode in which the base station 20 includes a pair of the optical transmitter 21 and the RF transmitter and receiver 22 has been described. However, the present invention is not limited to such a mode. For example, the base station 20 may include one RF transmitter and receiver 22 and a plurality of optical transmitters 21. In this case, the optical transmitter 21 may output light with wavelengths that are different from each other, or may output light with a same wavelength. Further, a mode may be provided in which the base station 20 include a plurality of RF transmitter and receiver 22 and one or a plurality of optical transmitters 21. The RF transmitter and receiver 22 may support wireless standards that are different from each other, or may support a same wireless standard.

Further, a mode may be provided in which the base station 20 does not include the optical transmitter 21 and the RF transmitter and receiver 22, that is, a mode in which the optical transmitter 21 and the RF transmitter and receiver 22 are outside the base station 20 and connect to the authentication information control circuit 23 of the base station 20 by wired or wireless connection. As a matter of course, one of the optical transmitter 21 and the RF transmitter and receiver 22 may be outside the base station 20. By freely arranging the base station 20, the optical transmitter 21, and the RF transmitter and receiver 22 in this way, the degree of freedom in designing the communication system of the present invention can be extended.

REFERENCE SIGNS LIST

10 Upper-level network
20 Base station
21 Optical transmitter
22 RF transmitter and receiver
23 Authentication information control circuit
24 Beam controller
30 Terminal
31 Optical receiver
32 Authentication information check circuit
33 RF transmitter and receiver
35 Area
41 Header
42 Logic section
43 Authentication Information section
44 Extension section
50 Base station control device
51 Authentication information integrated control unit
301, 302 Communication system

The invention claimed is:

1. A communication system in which communication between a base station and a terminal is performed by an optical wireless communication and an RF (Radio Frequency) wireless communication, wherein the base station includes:
    an optical transmitter that repeatedly transmits a frame to the terminal by the optical wireless communication, the frame including authentication information for permitting a communication using the RF wireless communication,
    wherein the RF wireless communication has a plurality of communication protocols;
    a base station RF transmitter and receiver that receives the authentication information transmitted by the RF wireless communication from the terminal, and transmits and receives communication data between the terminal and a network to and from the terminal by the RF wireless communication; and
    an authentication information control circuit that authenticates the terminal that has transmitted the authentication information and permits a communication between the authenticated terminal and the network, and the terminal includes:
    an optical receiver that receives the frame;
    an authentication information check circuit that extracts the authentication information from the frame; and
    a terminal RF transmitter and receiver that transmits the authentication information to the base station by the RF wireless communication, and transmits and receives communication data between the base station and the network to and from the base station by the RF wireless communication.

2. The communication system according to claim 1, wherein
    the optical transmitter forms the frame including the authentication information for each communication protocol, and repeatedly transmits the frames in order.

3. The communication system according to claim 1, wherein
    the authentication information check circuit causes the terminal RF transmitter and receiver to transmit the authentication information by using the communication protocol specified by information included in the frame and to transmit and receive the communication data.

4. The communication system according to claim 1, wherein
    the optical transmitter can transmit the frame with a plurality of wavelengths, and to use a desired communication protocol of the RF wireless communication with the terminal, transmits the frame with a wavelength corresponding to the desired communication protocol, and the authentication information check circuit causes the terminal RF transmitter and receiver to transmit the authentication information by using a communication protocol for the wavelength of the frame received by the optical receiver, and to transmit and receive the communication data.

5. The communication system according to claim 1, wherein a plurality of base stations are provided, and
the communication system further comprises a control device that
collects communication usage information related to the RF wireless communication from each of the base stations,
determines, based on the communication usage information, the base station with which the terminal is to communicate by the RF wireless communication, and
causes each of the base stations to transmit the frame in which an instruction for performing the RF wireless communication with the determined base station is included.

6. A base station that performs communication with a terminal by an optical wireless communication and an RF wireless communication, the base station comprising:
an optical transmitter that repeatedly transmits a frame to the terminal by the optical wireless communication, the frame including authentication information for permitting a communication using the RF wireless communication;
a base station RF transmitter and receiver that receives the authentication information transmitted by the RF wireless communication from the terminal, and transmits and receives communication data between the terminal and a network to and from the terminal by the RF wireless communication; and
an authentication information control circuit that authenticates the terminal that has transmitted the authentication information and permits a communication between the authenticated terminal and the network,
wherein the RF wireless communication has a plurality of communication protocols.

7. A communication method in which communication between a base station and a terminal is performed by an optical wireless communication and an RF wireless communication, the communication method comprising:
repeatedly transmitting a frame from the base station to the terminal by the optical wireless communication, the frame including authentication information for permitting a communication using the RF wireless communication;
extracting, by the terminal that has received the frame, the authentication information from the frame;
transmitting the authentication information to the base station by the RF wireless communication; and
authenticating, by the base station that has received the authentication information transmitted by the RF wireless communication from the terminal, the terminal that has transmitted the authentication information to permit a communication between the authenticated terminal and a network,
wherein the RF wireless communication has a plurality of communication protocols.

* * * * *